United States Patent
Hopkins et al.

(10) Patent No.: US 8,471,488 B1
(45) Date of Patent: Jun. 25, 2013

(54) REDUCING TOTAL HARMONIC DISTORTION IN A POWER FACTOR CORRECTED FLYBACK SWITCH MODE POWER SUPPLY

(75) Inventors: William Thomas Hopkins, Dickson, TN (US); Scott Rhodes, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 250 days.

(21) Appl. No.: 13/036,420

(22) Filed: Feb. 28, 2011

(51) Int. Cl.
*H05B 41/16* (2006.01)

(52) U.S. Cl.
USPC ............................ 315/247; 315/294; 315/307

(58) Field of Classification Search
USPC ................. 315/246, 247, 291, 294, 307, 308
See application file for complete search history.

(56) References Cited

U.S. PATENT DOCUMENTS

| 6,784,622 | B2 * | 8/2004 | Newman et al. | 315/219 |
| 8,373,363 | B2 | 2/2013 | Grajcar | |
| 2006/0132061 | A1 * | 6/2006 | McCormick et al. | 315/291 |
| 2008/0278092 | A1 * | 11/2008 | Lys et al. | 315/247 |
| 2011/0037414 | A1 * | 2/2011 | Wang et al. | 315/297 |

\* cited by examiner

*Primary Examiner* — Tung X Le
(74) *Attorney, Agent, or Firm* — King & Spalding LLP

(57) ABSTRACT

Total harmonic distortion (THD) at the AC line input of a power factor corrected (PFC) flyback switch mode power supply (SMPS) is reduced by adding additional current injection to the current programming signal of a PFC controller during the period of the line cycle where the AC input current wave shape is most flattened, i.e., around the peak portion of the AC line voltage. The input current drawn by the PFC flyback SMPS will then more closely resemble a desired sinusoidal waveform. A voltage dependent non-linear resistance is coupled in parallel with the normal current injection resistor that supplies current to the PFC flyback controller multiplier input to inject appropriate values of additional current into the PFC flyback controller based upon the AC input voltage value(s) so as to better shape the AC input current to the desired sinusoidal waveform.

17 Claims, 3 Drawing Sheets

REDUCING TOTAL HARMONIC DISTORTION IN A POWER FACTOR CORRECTED FLYBACK SWITCH MODE POWER SUPPLY

TECHNICAL FIELD

The present invention relates to power factor corrected flyback switch mode power supplies, and more specifically, the invention relates to reducing total harmonic distortion in a power factor corrected (PFC) flyback switch mode power supply (SMPS).

BACKGROUND

The PFC flyback SMPS is used in many applications requiring a low cost single stage solution to provide isolated and regulated DC output power with good power factor correction and moderate line current distortion. The control circuit used for the PFC flyback SMPS is one developed for the SMPS boost topology that requires a second stage to provide isolation and output voltage scaling. These controllers are readily available and are low in cost, making them attractive for a low cost PFC flyback SMPS that may be used for consumer and commercial applications, e.g., battery chargers, power supplies for electronics equipment, voltage step-down supplies for lighting applications such as, for example but not limited to, light emitting diode (LED) luminaires, etc.

However, one inherent shortcoming of the flyback topology is that the AC input current waveform tends to be somewhat distorted (flattened) as the sinusoidal voltage waveform peaks rather than the desired sinusoidal waveform. This increases total harmonic distortion (THD) and degrades power factor, e.g., less than 1. The controller circuit uses a sample of the incoming AC voltage sine waveform to program the threshold of the peak switching current envelope in an inductor that is in series with the rectified line. This programmed threshold follows the shape of the rectified line voltage. The boost PFC circuit operates at a frequency much higher than line frequency and produces triangular current waveforms that charge from zero to a peak value programmed by the controller. After the peak reaches the programmed threshold the controller turns off the power switching transistor and current discharges linearly to zero. The peak value of the triangular current waveform is twice the instantaneous value of AC input current, resulting in a sine wave of input current with low harmonic distortion. This works very well for a boost circuit where the average value of the sine is always one half of the peak value of the triangular wave form. However, this is less successful in a PFC flyback SMPS, where the relationship between the average rectified line current and the peak triangular inductor current is not one half and does not remain constant during a half cycle of line current. This error is due to the fact that the inductor discharge current does not flow from the line, but in the magnetizing inductance of the flyback transformer providing energy to the isolated secondary circuit. The waveform seen by the primary circuit is a linear ramp from zero to a peak value follow by a dead period where no current flows in the primary circuit. This dead time varies during the time of the line cycle and is of greater time duration near the peak. This dead time in the PFC flyback SMPS results in a flattened portion of the input current sine wave, resulting in increased THD of the AC input waveform. This problem is more fully described in ST (a registered trademark of STMicroelectronics) application note AN1059 available from STMicroelectronics at www.st.com, incorporated by reference herein for all purposes.

SUMMARY

The aforementioned deficiencies and needs are addressed by adding an additional current injection to the current programming signal of the PFC controller during the period of the line cycle where the AC input current wave shape is most flattened, i.e., around the peak portion of the AC line voltage. The input current drawn by the PFC flyback SMPS will then more closely resemble a desired sinusoidal waveform. This will decrease the total harmonic distortion (THD) at the AC line input that is generated by the PFC flyback SMPS. A voltage dependent non-linear resistance is coupled in parallel with the normal current injection resistor that supplies current to the PFC flyback controller multiplier input to inject appropriate values of additional current into the PFC flyback controller based upon the AC input voltage value(s) so as to better shape the AC input current to the desired sinusoidal waveform. Reduction of THD from about 15 percent to about 9 percent has been observed when adding just a single series connected zener diode and resistor to the current injection node of the PFC flyback controller. Further improvements may be realized with a more complex circuit configuration that more precisely injects appropriate values of additional current into the PFC flyback controller based upon the AC input voltage value(s) so as to better shape the AC input current to the desired sinusoidal waveform.

According to a specific example embodiment of this disclosure, a method of reducing total harmonic distortion (THD) in a power factor corrected (PFC) flyback switch mode power supply (SMPS) comprises the steps of: providing a high power factor SMPS controller having a multiplier input, wherein current injected into the multiplier input controls an amount of instantaneous current drawn from a power source during operation of a PFC flyback SMPS; providing a first current injection resistor coupled between the power source and the multiplier input of the high power factor SMPS controller for supplying a first injected current into the multiplier input; and providing a voltage dependent circuit network coupled between the power source and the multiplier input of the high power factor SMPS controller, wherein when a voltage from the power source is above a certain voltage value then the voltage dependent circuit network couples an additional injected current into the multiplier input that adds with the first injected current, thereby increasing the current injected into the multiplier input and decreasing the THD of the PFC flyback SMPS.

According to another specific example embodiment of this disclosure, a power factor corrected (PFC) flyback switch mode power supply (SMPS) having reduced total harmonic distortion (THD) comprises: a rectifier circuit for converting a sinusoidal alternating current (AC) power source to a full wave rectified sinusoidal waveform having a net DC value; PFC flyback SMPS transformer having a primary winding thereof coupled to the rectifier circuit; a power transistor switch coupled to the primary winding of the PFC flyback SMPS transformer; a high power factor SMPS controller having a drive output and a multiplier input, wherein the drive output is coupled to the power transistor switch such that the high power factor SMPS controller controls when the power transistor switch turns on or off, and the multiplier input controls an amount of instantaneous current drawn from the AC power source during operation of a PFC flyback SMPS; a first current injection resistor coupled between the rectifier circuit and the multiplier input of the high power factor SMPS controller for supplying a first injected current into the multiplier input; and a voltage dependent circuit network coupled between the AC power source and the multiplier input of the high power factor SMPS controller, wherein when a voltage from the AC power source is above a certain voltage value then the voltage dependent circuit network couples an additional injected current into the multiplier input that adds with the first injected current, thereby increasing the current injected into the multiplier input, and whereby THD of the PFC flyback SMPS is decreased.

BRIEF DESCRIPTION OF THE DRAWINGS

For a more complete understanding of the present invention and the advantages thereof, reference is now made to the following description, in conjunction with the accompanying figures briefly described as follows.

Figure 1:
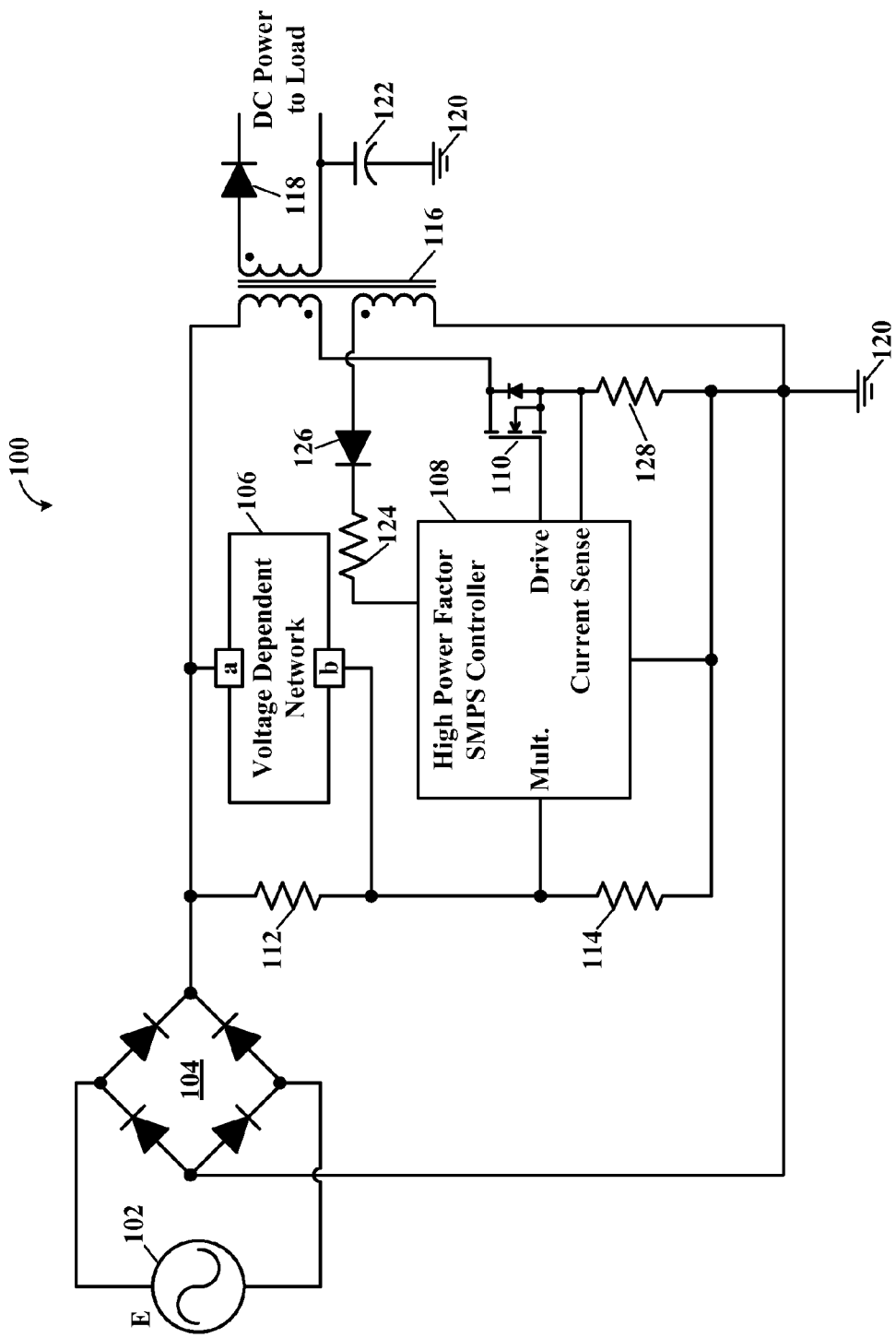
FIG. 1 illustrates a schematic diagram of a power factor corrected (PFC) flyback switch mode power supply (SMPS) with reduced total harmonic distortion (THD), according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Referring now to the drawings, details of specific example embodiments of the present invention are schematically illustrated. Like elements in the drawings will be represented by like numbers, and similar elements will be represented by like numbers with a different lower case letter suffix.

Referring to FIG. 1, depicted is a schematic diagram of a power factor corrected (PFC) flyback switch mode power supply (SMPS) with reduced total harmonic distortion (THD), according to a specific example embodiment of this disclosure. The PFC flyback SMPS, generally represented by the numeral 100, comprises a full-wave diode bridge rectifier 104 adapted for connection to an AC source 102, e.g., 120 VAC; a voltage dependent network 106, a high power factor SMPS controller 108, a power transistor switch 110, a current injection resistor 112, a shunt resistor 114, flyback power transformer 116, a first rectifier diode 118 for providing DC power to a load (not shown), a circuit common reference 120, a bypass capacitor 122, a resistor 124, and a second rectifier diode 126.

The second rectifier diode 126 and resistor 124 provide operating power to the high power factor SMPS controller 108 by rectifying a voltage from a tertiary winding of the flyback power transformer 116. The first rectifier diode 118 rectifies the AC voltage from the secondary winding of the flyback power transformer 116 and provides the DC power to a load, e.g., light emitting diode (LED) luminaire (not shown), that may be electrically isolated from the AC source 102. The bypass capacitor 122 reduces electromagnetic inference (EMI) that may be generated from the PFC flyback SMPS 100.

The high power factor SMPS controller 108 turns on and off the power transistor switch 110 so that a certain DC voltage is substantially maintained to the DC power load, e.g., LED luminaire (not shown) over an operating range of load currents and input voltages. A voltage feedback circuit, e.g., optical isolator-coupler (not shown) may be used to provide a feedback signal to the high power factor SMPS controller 108.

The current injection resistor 112 has a substantially higher resistance value then does the resistor 114 so that the multiplier input to the high power factor SMPS controller 108 does not go above a certain voltage value (E*R114/(R112+R114)). However, the multiplier input thereof draws more current through the current injection resistor 112 as the input voltage from the AC source 102 increases. The problem is, as more fully described in the aforementioned application note AN1059, that the instantaneous input current is the local average of the discontinuous flyback inductor current that only flows when the power transistor switch 110 is on. Since the flyback inductor discharge time is longest near the peak of the line voltage and the instantaneous line current is zero during the inductor discharge time, the average input current will fail to follow a sinusoidal waveform pattern and will tend to flatten the wave-shape near the peak as represented in the current curve 334 (I) of a portion (B) of the input waveform (A) shown in FIG. 3. Therefore what is needed is some way to increase the input current drawn by the PFC flyback SMPS 100 when the voltage input thereto is at higher voltage values. This may be accomplished, according to the teachings of this disclosure, by reducing the resistance value of the resistor 112 with the voltage dependent network 106. A current sense resistor 128 may be utilized as shown for measuring the current through the power transistor switch 110

Figure 2:
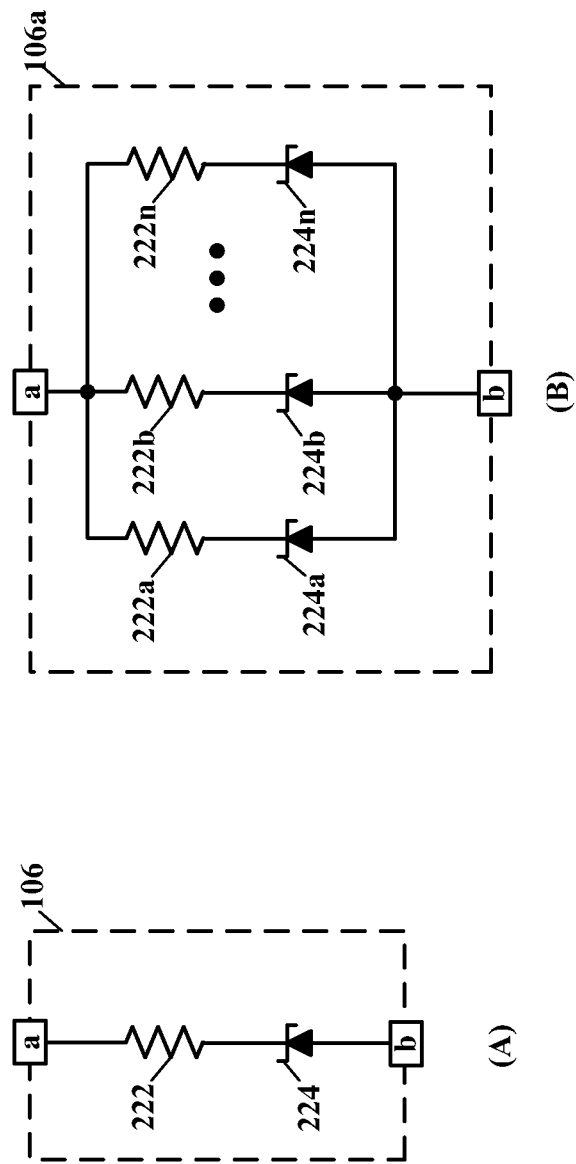
FIG. 2 illustrates schematic diagrams of some voltage dependent networks shown in FIG. 1, according to specific example embodiments of this disclosure.

Referring now to FIG. 2, depicted are schematic diagrams of some voltage dependent networks shown in FIG. 1, according to specific example embodiments of this disclosure. The voltage dependent network 106 may be a nonlinear resistance that is dependent upon a voltage value between nodes a and b. When the voltage value between the nodes a and b is less than the conduction (zener) voltage of the zener 224, then the resistor 222 is not connected between the nodes a and b. When the voltage value between the nodes a and b is equal to or greater than the conduction voltage zener 224, then the resistor 222 is effectively connected between the nodes a and b, and the resistor 222 is in parallel with the resistor 112, thus reducing the resistance value of the parallel combination thereof. This will cause more current to be injected into the multiplier input of the high power factor SMPS controller 108, thereby causing higher instantaneous input currents to be drawn from the AC source 102 during higher input voltage excursions.

Figure 3:
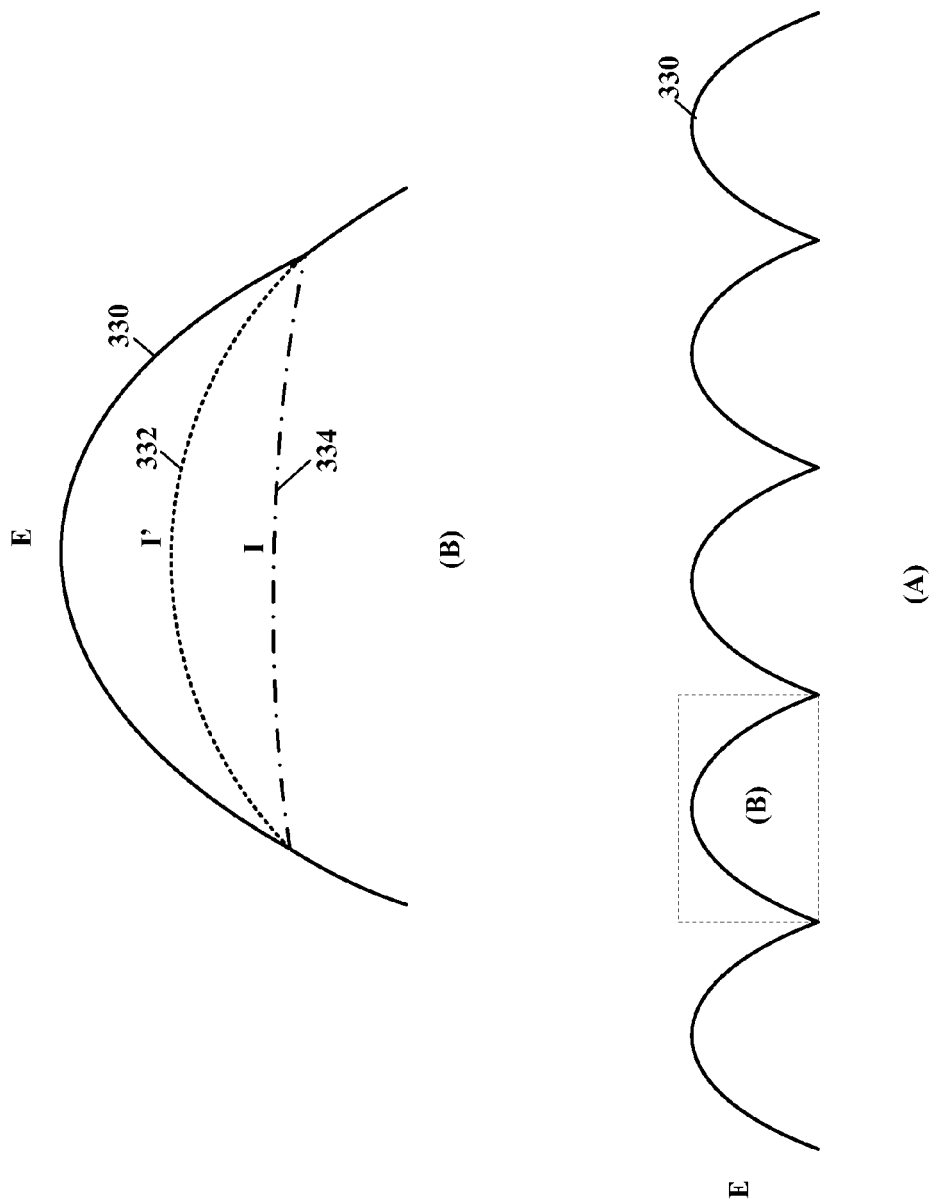
FIG. 3 illustrates a rectified sine wave and magnified portion of this sine wave showing the reduced total harmonic distortion (THD), according to the teachings of this disclosure.

Referring to FIG. 3, depicted is a rectified sine wave and magnified portion of this sine wave showing the reduced total harmonic distortion (THD), according to the teachings of this disclosure. This non-linear increase in the instantaneous input current based upon a change in the input voltage effectively increases the average input current represented by current curve 332 (I') of the portion (B) of the input waveform (A) shown in FIG. 3. Thus making the input current waveform a closer representation of a sinusoidal waveform as represented by the input voltage waveform 330, and thereby reducing THD coupled back to the AC power source 102.

Referring back to FIG. 2, the voltage dependent network 106a is another nonlinear resistance that is dependent upon a plurality of different voltage values between nodes a and b. The zeners 224a, 224b ... and 224n each have different conduction voltages then the others and may be arranged so that as the voltage values between the nodes a and b increase, more of the resistors 222a, 222b ... and 222n are connected in parallel. Thus when the voltage value is at a certain maximum value (not necessary the maximum peak voltage value), all of the resistors 222 are connected in parallel, thereby injecting a maximum current into the multiplier input of the high power factor SMPS controller 108, and thereby causing higher instantaneous input currents to be drawn from the AC source 102 during successively higher input voltage excursions. This increase in the instantaneous input current based upon a change in the input voltage effectively increases the average input current represented by current curve 332 (I') of the portion (B) of the input waveform (A) shown in FIG. 3. Thus making the input current waveform a closer representation of a sinusoidal waveform and thereby reducing THD coupled back to the AC power source 102. It is contemplated and within the scope of this disclosure, that other and further voltage dependent non-linear resistance networks may be readily designed by one having ordinary skill in electronic design and having the benefit of this disclosure.

Typical HPF flyback SMPS circuits using the L6561 PFC controller integrated circuit are shown in ST application notes AN1059 and AN1060, and ST application note AN2838 for a high power factor flyback converter using an L6562A as a light emitting diode (LED) luminaire power supply; all of which are available from STMicroelectronics at www.st.com, and all are hereby incorporated by reference herein for all purposes. It is contemplated and with the scope of this disclosure that one having ordinary skill in electronic circuits and SMPS design, and having the benefit of this disclosure, could easily adapt what is disclosed herein to other high PFC flyback controllers for an SMPS having excellent power factor and low total harmonic distortion.

Possible component values for the circuits shown in FIGS. 1 and 2 may be, for example but are not limited to, R114=12 kilohms, R112=1 megohm, R222=2 megohms, zener 224=51 volts; or R112=1.5 megohm, R222=1.5 megohm, and zener 224=75 volts. Many other combinations are contemplated herein. An even better approximation of a sinusoidal input current waveform may be accomplished with a voltage dependent network 106a like what is shown in FIG. 2 (B).

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A method of reducing total harmonic distortion (THD) in a power factor corrected (PFC) flyback switch mode power supply (SMPS), said method comprising the steps of:
providing a high power factor SMPS controller having a multiplier input, wherein current injected into the multiplier input controls an amount of instantaneous current drawn from a power source during operation of the PFC flyback SMPS;
providing a first current injection resistor coupled between the power source and the multiplier input of the high power factor SMPS controller for supplying a first injected current into the multiplier input; and
providing a voltage dependent circuit network coupled between the power source and the multiplier input of the high power factor SMPS controller, wherein when a voltage from the power source is above a certain voltage value then the voltage dependent circuit network couples an additional injected current into the multiplier input that adds with the first injected current, thereby increasing the current injected into the multiplier input and decreasing the THD of the PFC flyback SMPS,
wherein the voltage dependent circuit network comprises a zener diode and at least one second resistor connected in series, wherein a conduction voltage of the zener diode is substantially equal to approximately the certain voltage value.

2. The method according to claim 1, wherein the zener diode of the voltage dependent circuit network comprises a plurality of zener diodes, wherein the at least one second resistor of the voltage dependent circuit network comprises a plurality of second resistors, wherein each one of the plurality of zener diodes is connected in series with a respective one of the plurality of second resistors to form a series connected pair, and each of the series connected pairs of the zener diodes and the respective second resistors are connected in parallel with each other, wherein each of the plurality of zener diodes has a different conduction voltage that is substantially equal to or greater than approximately the certain voltage value.

3. The method according to claim 1, further comprising the step of providing a current sense circuit for measuring current through a power transistor switch.

4. The method according to claim 3, wherein:
the current sense circuit is a current sense resistor coupled between the power transistor switch and a power source common; and
a current sense input of the high power factor SMPS controller is coupled to the current sense resistor and the power transistor switch,
wherein the high power factor SMPS controller measures a voltage from the current sense resistor representative of current through the power transistor switch.

5. A power factor corrected (PFC) flyback switch mode power supply (SMPS) having reduced total harmonic distortion (THD), comprising:
a rectifier circuit for converting a sinusoidal alternating current (AC) power source to a full wave rectified sinusoidal waveform having a net DC value;
a PFC flyback SMPS transformer having a primary winding thereof coupled to the rectifier circuit;
a power transistor switch coupled to the primary winding of the PFC flyback SMPS transformer;
a high power factor SMPS controller having a drive output and a multiplier input, wherein the drive output is coupled to the power transistor switch such that the high power factor SMPS controller controls when the power transistor switch turns on or off, and the multiplier input controls an amount of instantaneous current drawn from the AC power source during operation of the PFC flyback SMPS;
a first current injection resistor coupled between the rectifier circuit and the multiplier input of the high power factor SMPS controller for supplying a first injected current into the multiplier input; and a voltage dependent circuit network coupled between the AC power source and the multiplier input of the high power factor SMPS controller, wherein when a voltage from the AC power source is above a certain voltage value then the voltage dependent circuit network couples an additional injected current into the multiplier input that adds with the first injected current, thereby increasing the current injected into the multiplier input, and whereby THD of the PFC flyback SMPS is decreased, wherein the voltage dependent circuit network comprises a zener diode and at least one second resistor connected in series, wherein a conduction voltage of the zener diode is substantially equal to approximately the certain voltage value.

6. The PFC flyback SMPS according to claim 5, wherein the zener diode of the voltage dependent circuit network comprises a plurality of zener diodes, wherein the at least one second resistor of the voltage dependent circuit network comprises a plurality of second resistors, wherein each one of the plurality of zener diodes is connected in series with a respective one of the plurality of second resistors to form a series connected pair, and each of the series connected pairs of the zener diodes and the respective second resistors are connected in parallel with each other, wherein each of the plurality of zener diodes has a different conduction voltage that is substantially equal to or greater than approximately the certain voltage value.

7. The PFC flyback SMPS according to claim 5, wherein a secondary winding of the PFC flyback SMPS transformer connected in series with a first rectifier diode supplies direct current (DC) voltage to a load.

8. The PFC flyback SMPS according to claim 7, wherein the load comprises a light emitting diode (LED) luminaire.

9. The PFC flyback SMPS according to claim 5, wherein a tertiary winding of the PFC flyback SMPS transformer connected in series with a second rectifier diode supplies direct current (DC) operating voltage to the high power factor SMPS controller.

10. The PFC flyback SMPS according to claim 5, wherein the rectifier circuit comprises a full-wave diode bridge circuit.

11. The PFC flyback SMPS according to claim 5, further comprising a current sense circuit for measuring current through the power transistor switch.

12. The PFC flyback SMPS according to claim 11, wherein:

the current sense circuit is a current sense resistor coupled between the power transistor switch and a power source common; and a current sense input of the high power factor SMPS controller is coupled to the current sense resistor and the power transistor switch, wherein the high power factor SMPS controller measures a voltage from the current sense resistor representative of current through the power transistor switch.

13. A method of reducing total harmonic distortion (THD) in a power factor corrected (PFC) flyback switch mode power supply (SMPS), said method comprising the steps of:

providing a high power factor SMPS controller having a current input, wherein current injected into the current input controls an amount of instantaneous current drawn from a power source during operation of the PFC flyback SMPS;

providing a first current to the current input of the high power factor SMPS controller; and providing a second current to the current input of the high power factor SMPS controller when a voltage from the power source is above a certain voltage value, wherein the second and first currents add at the current input of the high power factor SMPS controller, thereby increasing the current injected into the current input and decreasing the THD of the PFC flyback SMPS, wherein the second current is provided with a zener diode and at least one second resistor connected in series, wherein a conduction voltage of the zener diode is substantially equal to approximately the certain voltage value.

14. The method according to claim 13, wherein the first current is provided with a first resistor coupled between the power source and the current input of the high power factor SMPS controller.

15. The method according to claim 13, wherein the zener diode of the second current comprises a plurality of zener diodes, wherein the at least one second resistor of the second current comprises a plurality of second resistors, wherein each one of the plurality of zener diodes is connected in series with a respective one of the plurality of second resistors to form a series connected pair, and each of the series connected pairs of the zener diodes and the respective second resistors are connected in parallel with each other, wherein each of the plurality of zener diodes has a different conduction voltage that is substantially equal to or greater than approximately the certain voltage value.

16. The method according to claim 13, further comprising the step of providing a current sense circuit for measuring current through a power transistor switch.

17. The method according to claim 16, wherein:

the current sense circuit is a current sense resistor coupled between the power transistor switch and a power source common; and a current sense input of the high power factor SMPS controller is coupled to the current sense resistor and the power transistor switch, wherein the high power factor SMPS controller measures a voltage from the current sense resistor representative of current through the power transistor switch.

\* \* \* \* \*